United States Patent
Warrick

(10) Patent No.: US 7,192,060 B2
(45) Date of Patent: Mar. 20, 2007

(54) FLUID STORAGE AND TRANSPORT SYSTEM

(75) Inventor: Del Warrick, Tuggerah (AU)

(73) Assignee: Manroad Pty Limited, Charmhaven (AU)

( * ) Notice: Subject to any disclaimer, the term of this patent is extended or adjusted under 35 U.S.C. 154(b) by 529 days.

(21) Appl. No.: 10/694,501

(22) Filed: Oct. 27, 2003

(65) Prior Publication Data

US 2005/0087975 A1 Apr. 28, 2005

(51) Int. Cl.
*A47K 11/00* (2006.01)

(52) U.S. Cl. .......................................... 280/831; 4/321

(58) Field of Classification Search ................ 280/830, 280/831, 834; 4/321–323; 220/562–564, 220/663; 296/208
See application file for complete search history.

(56) References Cited

U.S. PATENT DOCUMENTS

| 6,006,935 | A | * | 12/1999 | Driver | ........................ | 220/23.4 |
| 6,598,242 | B1 | * | 7/2003 | Denome | ........................ | 4/321 |
| 6,659,503 | B2 | * | 12/2003 | Damron | ................... | 280/766.1 |
| 6,723,173 | B1 | * | 4/2004 | Golladay | ..................... | 134/21 |

* cited by examiner

*Primary Examiner*—Lesley D. Morris
*Assistant Examiner*—L Lum
(74) *Attorney, Agent, or Firm*—McCarter & English, LLP

(57) ABSTRACT

A fluid storage system and vehicle for transporting such fluid storage system are provided. An exemplary fluid storage system includes a fluid storage tank configured for mounting at the rear of the vehicle, the fluid storage tank having a base, at least one enclosing side wall and a tank top that is adapted to form a loading tray of the vehicle. The fluid storage tank may include spaced apart baffles, one or more side windows for observing tank contents and/or a plurality of sealed compartments. Vents may be provided in communication with vent outlets disposed on a loading tray headboard associated with the system/vehicle. Transport vehicles may be provided that include a tray back for supporting goods, the tray back being adapted to form a fluid storage tank. The fluid storage tank formed by the tray back may include structural features of the disclosed fluid storage system, e.g., a fluid storage tank configured for mounting at the rear of the vehicle, the fluid storage tank having a base, at least one enclosing side wall and a tank top that is adapted to form a loading tray of the vehicle.

17 Claims, 4 Drawing Sheets

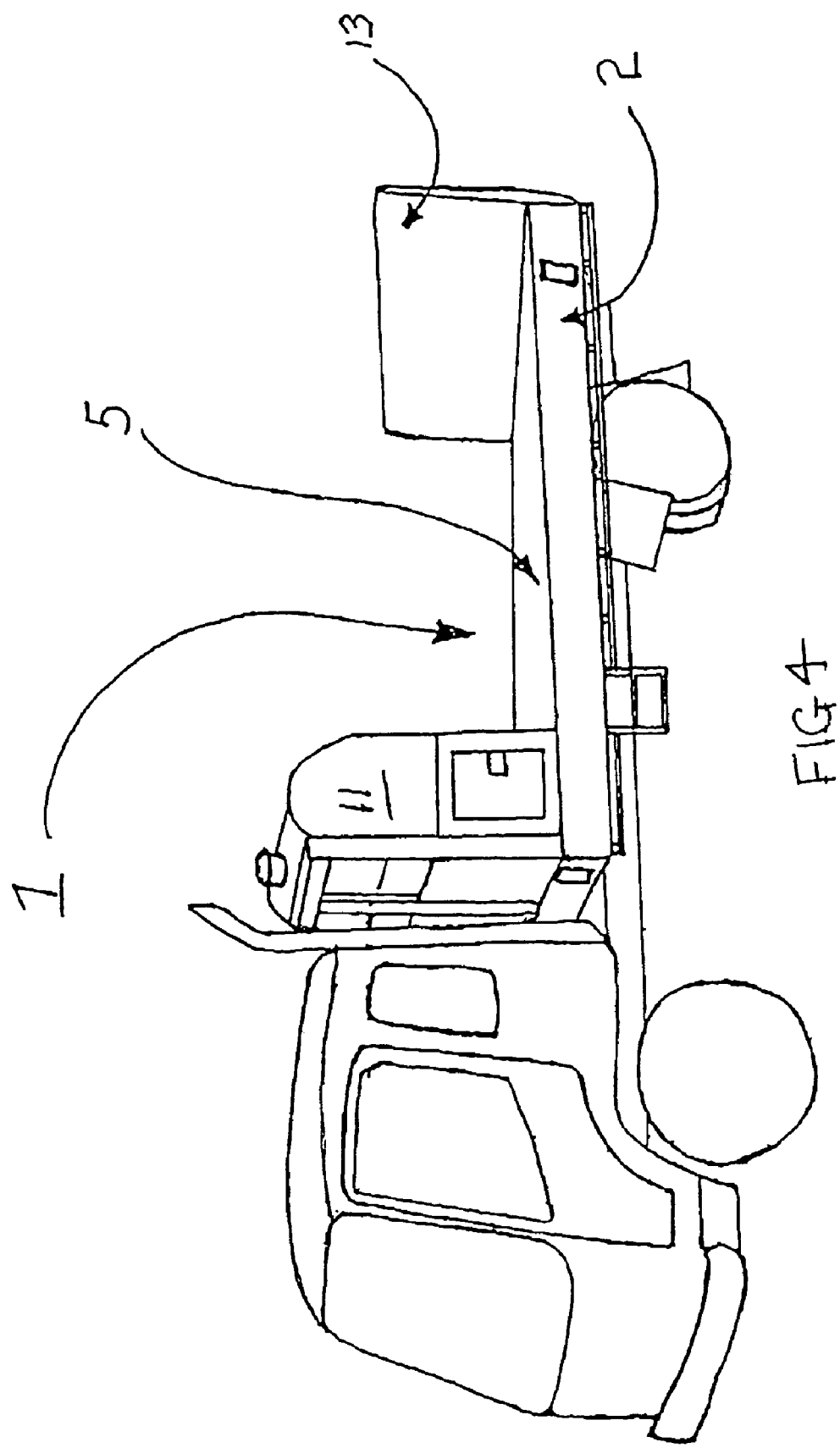

FLUID STORAGE AND TRANSPORT SYSTEM

FIELD OF THE INVENTION

The invention relates to fluid transport systems and, in particular, to fluid transport systems for vehicles.

The invention has been developed primarily for use with waste fluid transport vehicles and will be described hereinafter with reference to this application. However, it will be appreciated that the invention is not limited to this particular field of use.

BACKGROUND OF THE INVENTION

Conventional waste fluid transport systems such as portable toilet transport vehicles generally include a flat bed or tray truck. A vacuum tank and a vacuum pump are disposed at the centre of the load carrying area of the truck tray, the vacuum tank being of load carrying area configured to receive waste fluids from the portable toilets, septic tanks or other waste fluid reservoirs.

Waste fluid is pumped into the storage tank until a predetermined volume of fluid is contained. At this time, the storage tank is pumped or drained into a reservoir located at a waste treatment facility, for example.

In addition to the vacuum apparatus and main waste storage being mounted to the vehicle, a fresh water storage tank can also be provided. The fresh water tank is generally mounted to the tray of the vehicle, the fresh water being used for cleaning purposes or filling fresh water reservoirs disposed in the portable toilets.

A significant disadvantage of known waste fluid transport vehicles such as those described above lies in the very limited vehicle tray space available to transport the portable toilets or other goods due to the presence of the vacuum and main waste storage tanks mounted on the tray. That is, only a limited number of portable toilets, for example, can be loaded onto the tray for transport due to the significant amount of space taken up by the main waste storage tank.

Furthermore, the presence of the vacuum and main waste storage tanks limits the space available for loading and transporting additional goods, especially if the vacuum and/or waste storage tanks extend a substantial distance above the tray.

OBJECT OF THE INVENTION

It is an object of the present invention to provide a fluid storage and transport system which will overcome or substantially ameliorate at least some of the deficiencies of the prior art, or to provide a useful alternative.

BRIEF SUMMARY OF THE INVENTION

According to a first aspect of the present invention there is provided a fluid storage system for a vehicle, the system comprising a fluid storage tank configured for mounting at the rear of the vehicle, the fluid storage tank having a base, at least one enclosing side wall and a tank top being adapted to form a loading tray of the vehicle.

According to a second aspect of the invention there is provided a transport vehicle having a tray back for supporting goods, the tray back being adapted to form a fluid storage tank.

According to another aspect of the invention there is provided a vehicle trailer configured for transporting goods, the trailer comprising a fluid storage tank mounted thereto and having a base, at least one enclosing side wall and a tank top wherein the fluid storage tank top is adapted to form a loading tray of the trailer.

Thus, there is provided a fluid storage system which allows additional goods to be transported over known systems by removing the need for a main fluid storage tank to be mounted on a vehicle tray.

BRIEF DESCRIPTION OF THE DRAWINGS

A preferred embodiment of the invention will now be described, by way of example only, with reference to the accompanying drawings in which:

FIG. 4 is a perspective view of a vehicle including the waste fluid storage system of FIG. 1.

DETAILED DESCRIPTION OF THE INVENTION

Figure 1:
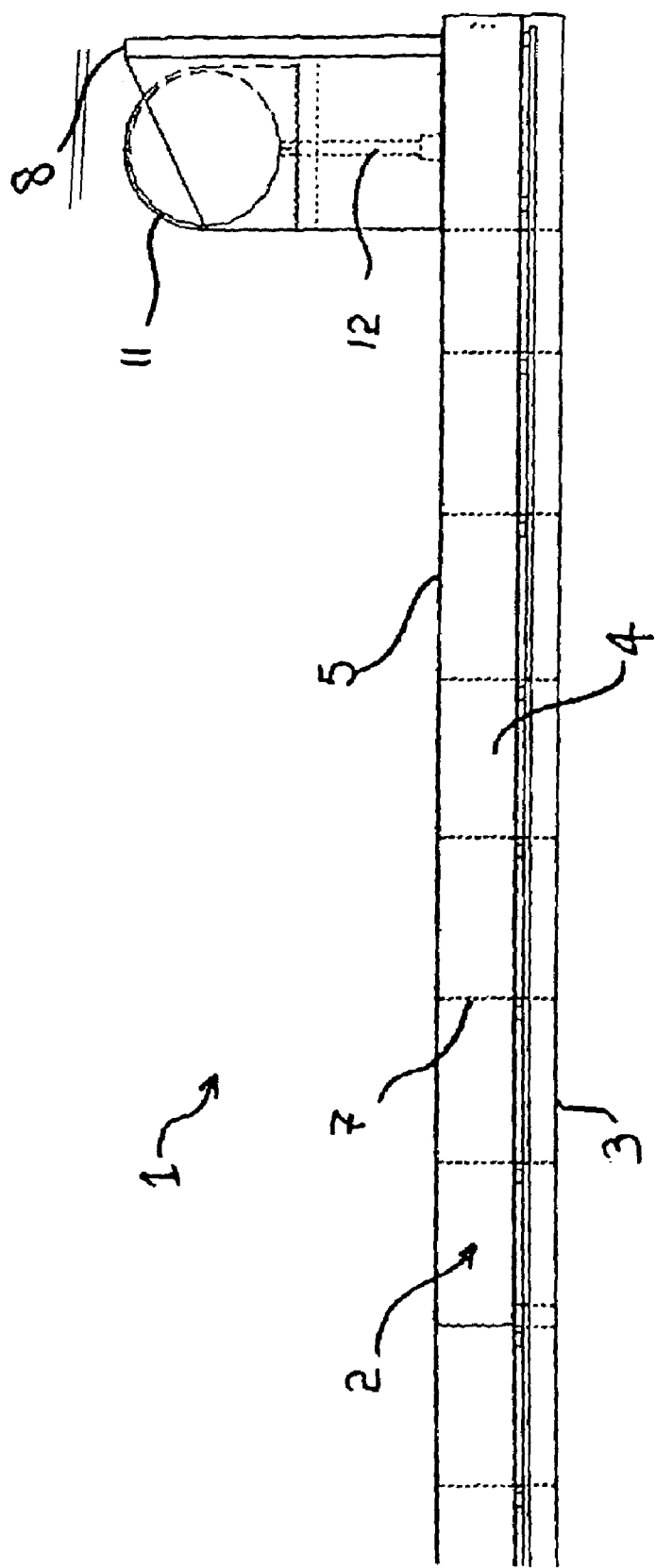
FIG. 1 is a side view of a waste fluid storage system according to the preferred embodiment.
Figure 2:
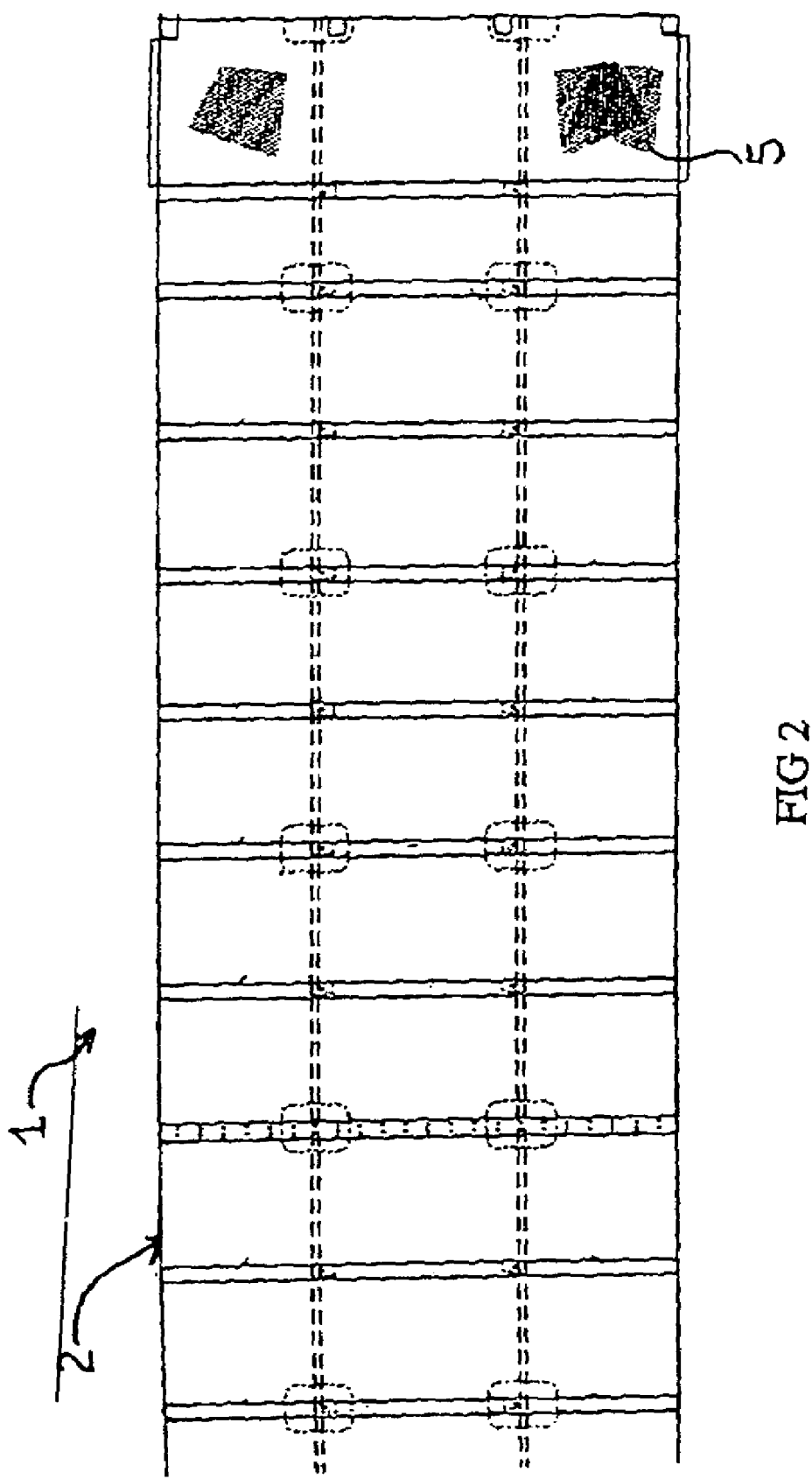
FIG. 2 is a plan view of the system of FIG. 1.

Referring to the drawings there is shown a fluid storage system 1 for a vehicle. The system 1 includes a fluid storage tank 2 configured for mounting at the rear of the vehicle. The fluid storage tank 2 includes a base 3 and at least one enclosing sidewall 4. The tank 2 further includes a tank top 5 removably mounted to the enclosing sidewall 4 and being adapted to form a loading tray of the vehicle.

The enclosing sidewall 4 and the base 3 are composed of steel and are welded together to provide a fluid tight seal. The storage tank top 5 is also composed of steel and is removably mounted to the enclosing sidewall 4. The tank top 5 is preferably mounted to the sidewall 4 by means of a plurality of nuts and bolts, however, in other embodiments (not illustrated) the fluid storage tank top 5 is hingedly mounted to the sidewall 4.

The fluid storage tank base 3 is sloped away from the sides of the fluid storage tank 2 so as to define a fluid drainage point. This is best illustrated in FIG. 3 wherein the fluid drainage point is denoted by the numeral 6.

The fluid storage tank 2 further includes a plurality of spaced apart baffles 7 to check the flow of fluids stored within the tank 2. Although not illustrated, the enclosing sidewall 4 of the fluid storage tank 2 includes one or more side windows for observing the fluid level of the fluid storage tank 2. In other embodiments (not illustrated) one or more floats in communication with a gauge can be provided to provide an indication of the fluid level in the fluid storage tank 2.

Figure 3:
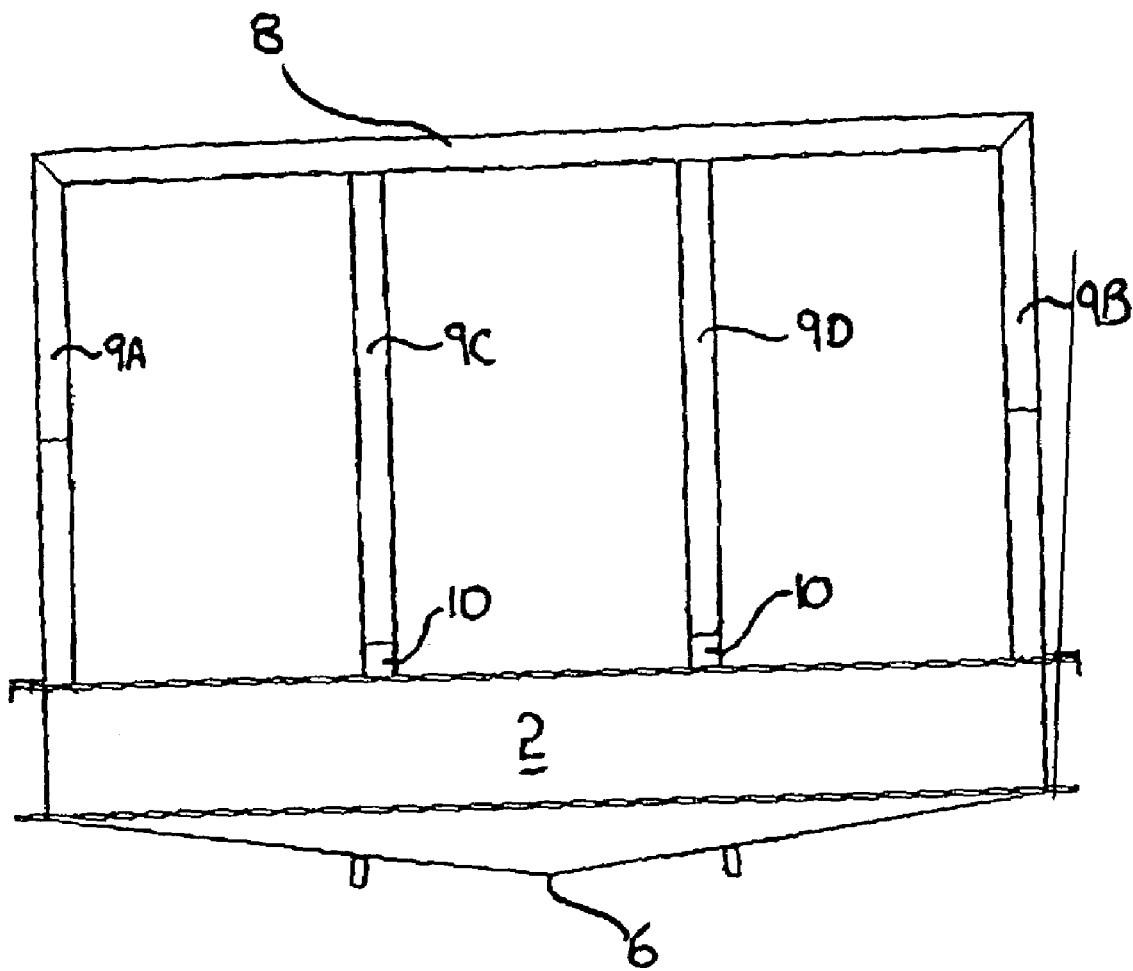
FIG. 3 is a front view of the system of FIG. 1.

As best shown in FIG. 3, a headboard 8 is mounted to a front end of the fluid storage tank 2. The headboard 8 is formed from tubular steel having four interconnected legs 9. The outer legs are 9A and 9B in fluid communication with the fluid storage tank 2 to provide a vent. The centre legs 9C and 9D are in fluid communication with the outer legs 9A and 9B and include a vent outlet 10 at the lower end of each leg 9C and 9D.

As best shown in FIG. 1, the vehicle includes a vacuum storage tank 11 mounted adjacent the head board 8 and supported by the tank top 5. The vacuum tank 11 is in fluid communication with the fluid storage tank 2 via a duct 12. A pump (not illustrated) is disposed near the vacuum tank 11 to pump fluids from a building site, portable toilet or other fluid source.

When the fluid level in the vacuum tank 11 reaches a predetermined level, a valve (not illustrated) is actuated to allow the vacuum tank to drain into the fluid storage tank 2. In this way, fluids can be stored in the fluid storage tank 2 and other goods can be loaded onto the tank top 5 in place of conventionally known fluid storage tanks which are mounted to the loading tray of trucks.

As best shown in FIG. 4, the transport vehicle includes a tailgate loader 13 to facilitate the loading of goods such as portable toilets or any other desired goods onto the loading tray being the tank top 5. In other embodiments (not illustrated), the transport vehicle includes a crane mounted at the rear of vehicle instead of the tailgate loader 13.

Although not illustrated, the fluid storage tank 2 can include two or more sealed compartments for storing different fluids. For example, a fresh water compartment can be provided in the fluid storage tank 2 for use in the water spraying activities such as cleaning and the like and the other compartment of the fluid storage tank 2 is used for waste fluids or other fluids not to be mixed with fresh water. The volume of a fresh water compartment would be small compared with the volume of the second compartment. In the case of employing the vehicle for servicing and transporting portable toilets, more waste fluid would be collected than fresh water dispensed in cleaning or refilling water reservoirs. In applications such as servicing septic tank systems, a second or other fluid compartments are not desirable.

It can be seen that a conventional truck can be modified so that the fluid storage tank 2 is mounted to the rear end of a vehicle and the fluid storage tank top 5 forms a loading tray of the vehicle. Similarly, any vacuum tanks or pumps or other equipment can be mounted, for example, to the underside of the tank 2 so as to maximise the carrying area of the tank top 5.

Similarly, a conventional trailer can be configured such that the trailer floor corresponds to the fluid storage tank top 5 and the fluid storage tank 2 is mounted to the trailer.

It is noted that in some embodiments the fluid storage tank top 5 is removably mounted to allow cleaning and servicing of the tank 2.

The foregoing describes only a preferred embodiment of the present invention and modifications, obvious to those skilled in the art, can be made thereto without departing from the scope of the present invention.

The invention claimed is:

1. A fluid storage system for a vehicle, the system comprising a fluid storage tank configured for mounting at the rear of a vehicle, the fluid storage tank having a base, at least one enclosing side wall and a tank top being adapted to form a loading tray of the vehicle, wherein the fluid storage tank comprises one or more vents in fluid communication with one or more vent outlets disposed in a loading tray headboard.

2. A system according to claim 1, wherein the fluid storage tank base is sloped away from the tank top defining a fluid drainage point.

3. A system according to claim 1, wherein the fluid storage tank comprises a plurality of spaced apart baffles.

4. A system according to claim 1, wherein the enclosing sidewall includes one or more side windows for observing the fluid level of the fluid storage tank.

5. A system according to claim 1, wherein the fluid storage tank comprises a plurality of sealed compartments, each configured for storing separate fluids.

6. A system according to claim 1, wherein the enclosing sidewall and base are formed from steel and are welded together, and the fluid storage tank top is removably mounted to the enclosing sidewall.

7. A transport vehicle having a tray back for supporting goods, the tray back being adapted to form a fluid storage tank having a base, at least one enclosing side wall and a tank top being adapted to form a loading tray of a vehicle, wherein the fluid storage tank includes one or more vents in fluid communication with one or more vent outlets disposed in a loading tray headboard.

8. A transport vehicle according to claim 7, further comprising a vacuum unit comprising a vacuum pump in fluid communication with a vacuum tank, the vacuum tank being in fluid communication with the fluid storage tank.

9. A transport vehicle according to claim 8, wherein the vacuum unit is supported by the fluid storage tank top at a front end thereof.

10. A transport vehicle according to claim 9, further comprising a tailgate loader mounted at a rear end of the vehicle.

11. A transport vehicle according to claim 9, further comprising a crane mounted at a rear end of the vehicle.

12. A transport vehicle according to claim 7, further comprising two sealed compartments, one compartment for storing waste fluids and the other compartment for storing potable or reticulated water.

13. A transport vehicle according to claim 12, wherein the potable or reticulated water compartment comprises an outlet in fluid communication with a fluid pump for pumping the potable or reticulated water.

14. A transport vehicle according to claim 13, wherein the fluid pump is hydraulically powered.

15. A transport vehicle according to claim 7, wherein the vehicle is configured to transport or service portable or temporary toilets, or septic tank systems.

16. A method of providing a tray back vehicle for transporting fluids, the method comprising the step of mounting a fluid storage tank to the rear of a vehicle, said storage tank having a base, at least one enclosing side wall and a tank top being adapted to form a loading tray of the vehicle, wherein the fluid storage tank includes one or more vents in fluid communication with one or more vent outlets disposed in a loading tray headboard.

17. A vehicle trailer configured for transporting goods, the trailer comprising a fluid storage tank mounted thereto and having a base, at least one enclosing side wall and a tank top, wherein the fluid storage tank top is adapted to form a loading tray of the trailer and wherein the fluid storage tank includes one or more vents in fluid communication with one or more vent outlets disposed in a loading tray headboard.

* * * * *